United States Patent
Michels

[11] Patent Number: 5,725,291
[45] Date of Patent: Mar. 10, 1998

[54] ELECTRONICALLY CONTROLLED BRAKE BOOSTER AND METHOD OF OPERATION THEREOF

[75] Inventor: Erwin Michels, Kail, Germany

[73] Assignee: Lucas Industries public limited company, Great Britain

[21] Appl. No.: 735,962

[22] Filed: Oct. 23, 1996

Related U.S. Application Data

[62] Division of Ser. No. 533,754, Sep. 26, 1995.

[30] Foreign Application Priority Data

Oct. 11, 1994 [DE] Germany ............... 44 36 297.8

[51] Int. Cl.⁶ ......................................... B60T 8/44
[52] U.S. Cl. ............................ 303/125; 303/114.3
[58] Field of Search ...................... 303/125, 113.4, 303/114.3, 155, 115.4; 91/369.1, 376 R, 533; 92/48, 49

[56] References Cited

U.S. PATENT DOCUMENTS

| | | | |
|---|---|---|---|
| 4,633,757 | 1/1987 | Kubota | 91/369.1 X |
| 5,332,056 | 7/1994 | Niibe et al. | 303/114.3 X |
| 5,445,444 | 8/1995 | Rump et al. | 303/125 |

FOREIGN PATENT DOCUMENTS

| | | |
|---|---|---|
| 4028290C1 | 1/1992 | Germany . |
| 4102496A1 | 2/1992 | Germany . |
| 4217409A1 | 12/1993 | Germany . |

*Primary Examiner*—Lee W. Young
*Attorney, Agent, or Firm*—Wood, Herron & Evans L.L.P.

[57] ABSTRACT

An electronically controlled brake booster for a road vehicle brake system having a housing comprises a vacuum chamber (16) and a servo chamber (14) separated from said vacuum chamber (16) by a movable wall (18), an electromagnetically operatable control valve device (20) which is coupled to said movable wall (18) for common relative movement with respect to the housing of the brake booster and a sensor (32) which, for an electronic control device (ECU), senses operating conditions of the road vehicle brake system and produces signals characteristic for these operating conditions which signals are evaluated by said control device (ECU) for producing drive signals ($S_{1a}$, $S_{1b}$) for said control valve device (20), wherein the sensor is formed as a pressure sensor (32) and senses at least the pressure ($p_{AK}$) prevailing in said servo chamber (14).

11 Claims, 7 Drawing Sheets

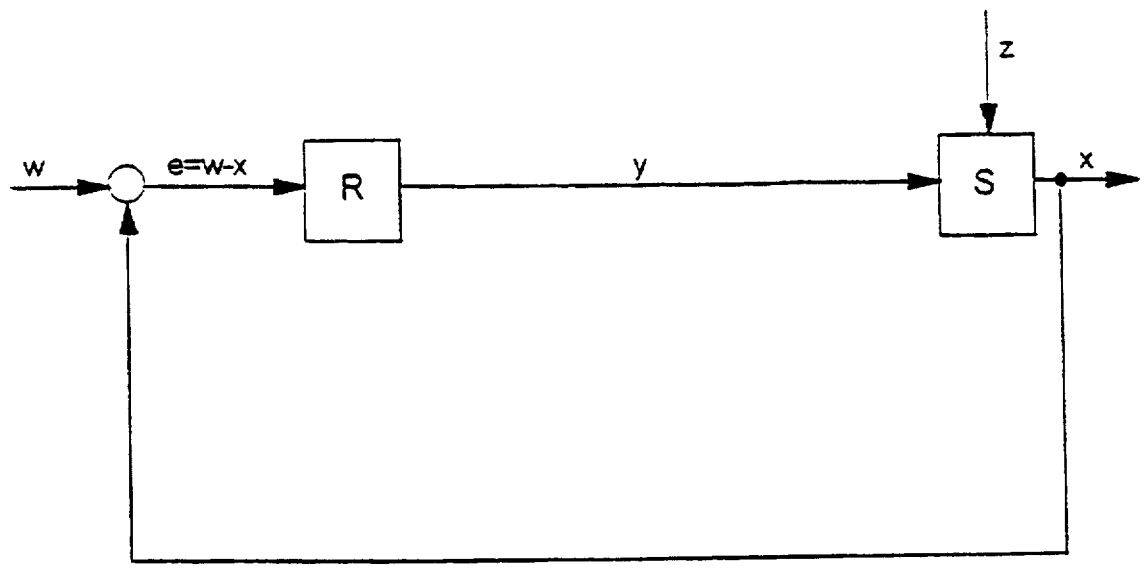

| | | |
|---|---|---|
| controlled quantity | x: | $a_{vehicle}$ |
| control difference | e | |
| regulated quantity | y: | valve travel |
| control input | w: | $a_{Soll}$ (given by the system) |
| disturbance quantity | z: | friction variations |
| controller | R: | electronic control device |
| controlled system | S: | electromagnetically operatable control valve device<br>brake booster<br>main brake cylinder<br>throttle element<br>anti-block system<br>wheel brakes<br>road |

FIG. 4

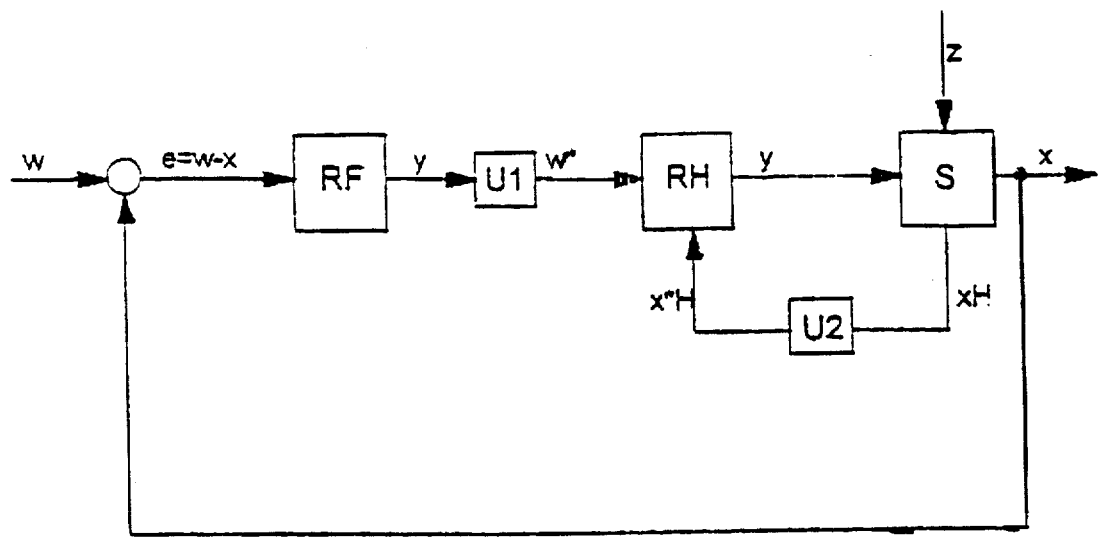

| | | |
|---|---|---|
| controlled quantity | x: | $a_{vehicle}$ |
| control difference | e | |
| regulated quantity | y: | valve travel |
| control input auxiliary controler | w*: | reference pressure difference value between servo chamber and vacuum chamber ($dp_{soll}$) |
| control input | w: | $a_{soll}$ (is given by the system) |
| auxiliary control input | xH: | pneumatic pressure |
| auxiliary control input after transformation | x*H | |
| disturbance quantity | z: | friction variations |
| master controller | RF: | electronic control device |
| auxiliary controller | RH: | electronic control device |
| transformer | U1, U2: | electronic calculator |
| control system | S: | electromagnetically operatable control valve device brake booster main brake cylinder throttle element anti-block system wheel brakes road |

FIG.6

ELECTRONICALLY CONTROLLED BRAKE BOOSTER AND METHOD OF OPERATION THEREOF

CROSS-REFERENCE TO RELATED APPLICATION

This application is a divisional of application Ser. No. 08/533,754, filed Sep. 26, 1995, currently pending.

DESCRIPTION

The present invention relates to an electronically controlled brake booster for a brake system of a road vehicle comprising a housing having a vacuum chamber and a servo chamber separated from said vacuum chamber by a movable wall, an electromagnetically operatable control valve device which is coupled to said movable wall for a common relative movement with respect to said housing, and a sensor sensing the operating conditions of said road vehicle brake system for an electronic control device and producing signals which are characteristic for said operating conditions, which signals are evaluated by said control device for producing drive signals for said control valve device.

Such system is known from DE 40 28 290 C1 wherein the operating speed of the brake pedal caused by the driver in its respective position is the only criterion taken for triggering an automatic braking. In the system described therein a comparison is made between the speed of operation of the brake pedal in its respective position caused by the driver and an invariable threshold value and depending on the result of such comparison an emergency braking is induced or not.

DE 41 02 496 A1 discloses a brake pressure control device which measures the force applied to the brake pedal or, as a value directly correlated therewith, the brake pressure produced in a hydraulic brake circuit in order to lock that brake circuit in which an increased brake pressure is measured when a threshold value is exceeded.

Moreover, triggering the emergency braking means that the main brake hoses have to be locked with respect to the main brake cylinder and the output pressure of an auxiliary pressure source has to be applied in a valve controlled manner to the wheel brakes. This results in that there is no longer a connection between the hydraulic side of the brake pedal and the wheel brakes so that the brake pedal has become "hard" and path-dependent control of the automatic brake operation is no longer possible, provided no additional buffer volumes which can be displaced by the driver's pedal operation with the main brake cylinder being locked with respect to the wheel brakes are provided. This would be the only possibility of a simulation of the pedal travel from the variation in time of which a driver's request regarding the expected vehicle deceleration could be recognized and taken into account during the further braking.

Further, such method of operation has the disadvantage that delay times inherent in the system, the rigidity of the hydraulic system, the brake booster and the mechanical backlash of the brake pedal mechanics, particularly at the beginning of the pedal operation path, lead to operating speeds of the brake pedal which trigger an automatic brake operation not requested by the driver since the respective threshold is reached or exceeded for a short time, respectively.

This means that with a brake system having a lower rigidity the predetermined threshold is reached too early, while with a brake system having a rigidity which is too high the predetermined threshold is reached too late. Since the rigidity of the brake system even can change while the vehicle is in motion and over the service life of the vehicle, a reliable operation of the brake system is not always ensured.

The problem underlying the invention is to improve an electronically controlled brake booster for a road vehicle brake system of the kind mentioned before so that the influence of the delay times inherent in the system and the rigidity of the hydraulic system and the brake booster, respectively, and the mechanical backlash of the brake pedal mechanics are as low as possible.

In order to solve this problem, the sensor is formed as a pressure sensor and senses or detects at least the pressure prevailing inside the servo chamber.

The invention is based on the surprising finding that the pressure in the servo chamber does not depend on the rigidity of the brake system because the pressure variation is initiated only by a relative movement of the drive rod displaced by the brake pedal to the body of the control valve device. However, for substantial portions of the brake pedal operation, particularly at the beginning of the operation path, this movement is not correlated with the axial relative movement of the control valve device to the housing of the brake booster, which results from the following considerations:

Since at the beginning of a pedal operation mainly mechanical backlashes have to be overcome, comparatively high pedal operation speeds occur which, however, at that time do not result in an opening of the control valve device and, therefore, a displacement of the movable wall by said control valve device.

While in a system according to DE 40 28 290 C1 the travel of the brake pedal drive rod with respect to the bodywork of the vehicle is detected and changed into a brake pedal operating speed signal, according to the present invention the energy applied to the brake pedal by the driver is detected as the value proportional to the servo chamber pressure.

Slow operation of the brake pedal (with increasing force) over a longer period may cause the same servo chamber pressure as a quick operation of the brake pedal over a shorter period. This is because under operation of the brake pedal the control valve is opened so that air flows into the servo chamber and causes a displacement of the movable wall. It does not makes a difference for the volume of air flowing in whether the control valve is opened wide for a short period or just a little for a longer period. The displacement of the diaphragm disk, while the volume of the servo chamber increases, is effected against the counterforces present in the brake system (reset springs in the brake booster, brakes etc.). However, these counterforces increase when the pedal operation increases. Therefore, the energy induced (force applied to the brake pedal integrated over the displacement path linked with the amplification factor of the brake booster) can be evaluated by using the pressure sensor via the pressure sensed in the servo chamber.

The dependent apparatus claims relate to preferred embodiments of the brake booster according to the present invention.

The pressure sensor can be arranged at or in a fixed wall of the housing or at or in the movable wall.

According to a preferred embodiment of the invention, the pressure sensor does not only sense the absolute pressure prevailing in the servo chamber but the pressure difference between the pressure prevailing in the vacuum chamber and the pressure prevailing in the servo chamber and produces a signal for the control device which is characteristic for this pressure difference.

According to a further preferred embodiment of the invention, the pressure sensor senses the pressure difference between the pressure prevailing in the surrounding atmosphere of the brake booster and the pressure prevailing in the servo chamber and produces a signal for the control device which is characteristic for this pressure difference.

Due to the measurement of the pressure difference the produced signal is independent of variations of the ambient pressure which simplifies the further processing.

Instead of a pressure difference sensor a second pressure sensor can be arranged outside the housing or in the vacuum chamber which pressure sensor senses the pressure prevailing in the surrounding atmosphere of the brake booster or the pressure prevailing in the vacuum chamber, respectively, and produces a signal for the control device which is characteristic for this pressure.

In such case both the signal for the pressure in the servo chamber and the signal for the ambient pressure or the pressure prevailing in the vacuum chamber are transmitted to the control device and are evaluated there for further processing and control signal production.

The invention also relates to a method of operation of a vehicle brake system having an electronically controlled brake booster comprising the following steps:

a) sensing the pressure prevailing in the servo chamber of said brake booster, b) producing a signal which is characteristic for said pressure in said servo chamber, and c) evaluating this signal in order to produce a drive signal for a control valve device of said brake booster which can be operated electromagnetically, and d) outputting a drive signal to said control valve device, which drive signal causes operation of said brake booster regarding building up or reduction of a brake pressure.

In this way it is possible in a simple manner to activate emergency or target braking and to realize cruise control or cruise dynamic control (CDC).

The dependent method claims relate to preferred embodiments of the method of operation of a vehicle brake system having an electronically controlled brake booster according to the present invention.

According to a preferred embodiment, step c) comprises the following:

c1) Linking the signal which is characteristic for the pressure prevailing in the servo chamber with a signal which is characteristic for the pressure prevailing in the surrounding atmosphere of the brake booster or the pressure prevailing in the vacuum chamber of the brake booster to a common signal.

In order to obtain the variation in speed of the pressure in the servo chamber or of the differential pressure between the servo chamber and the surroundings of the vacuum chamber, step c) further comprises the following:

c2) Differentiating the (common) signal with respect to the time in order to obtain a differentiation signal.

This can be executed in the electronic control device.

In order to initiate an emergency braking or a target braking, step c) further comprises the following:

c3) Comparing the differentiation signal with a predetermined threshold value.

For the sake of safety, the progression of the non-differentiated signal also can be evaluated in order to initiate automatic braking also at high pressure values which are attained slowly. The threshold value can be a preset fixed value or can be obtained from a map depending on further parameters (for example vehicle speed).

In order to initiate the emergency or target braking, step c) further comprises the following:

c4) Producing a first drive signal in case the differentiation signal is larger than or equal to the momentary threshold value, wherein the first drive signal is dimensioned such that it causes an operation of the brake booster which causes a different, preferably larger brake pressure than a brake pressure which would correspond to the momentary position of a brake pedal connected to said brake booster.

Preferably, said first drive signal is dimensioned such that it causes the maximally possible brake pressure. This may happen without risk since the anti-lock system control action provides that blocking of the wheels does not occur.

In order to enable the driver to terminate the emergency or target braking, step c) further comprises the following:

c5) Sensing an operation position of the brake pedal and c6) producing a reset signal representing a reset of the brake pedal for a predetermined pedal travel.

When the reset signal is present, a further step follows:

e) Outputting a second drive signal to the control valve device, which drive signal causes an operation of said brake booster regarding reduction of the brake pressure to normal pressure.

This means that the brake booster is brought back to its normal operation characteristic and the brake pressure is reduced correspondingly.

In order to realize the extension of the brake system for a cruise control or for example a safety distance control, the method is extended by the following step:

f) Producing a trigger signal for the electronic control device which is independent of the operation of the brake pedal, said control device producing in dependence on said trigger signal a signal which causes an operation of the brake booster which causes another, preferably larger deceleration of the vehicle than the momentary one.

The trigger signal can be a vehicle acceleration or deceleration, respectively, which is to be attained, the speed of a preceeding vehicle or a further signal, which for example is produced by a distance radar.

In brake systems which do not have a deceleration value standard via a controller or which do not obtain a signal representing the operation of the pedal, the brake pressure in the main brake cylinder can be used in a linear relation to the servo chamber (differential) pressure as an auxiliary value in order to obtain for example the brake pressure by sensing the servo chamber pressure or the differential pressure between the servo chamber and the surroundings of the vacuum chamber. Thus, a getaway assistance or an anti-skid control system can be realized.

With reference to the drawings, embodiments of the invention together with further characteristics, features and advantages are explained in the following description.

FIG. 4 shows a schematic block diagram of a first embodiment of an automatic control according to the present invention.

FIG. 6 shows a schematic block diagram of a second embodiment of the automatic control according to the present invention.

Figure 1:
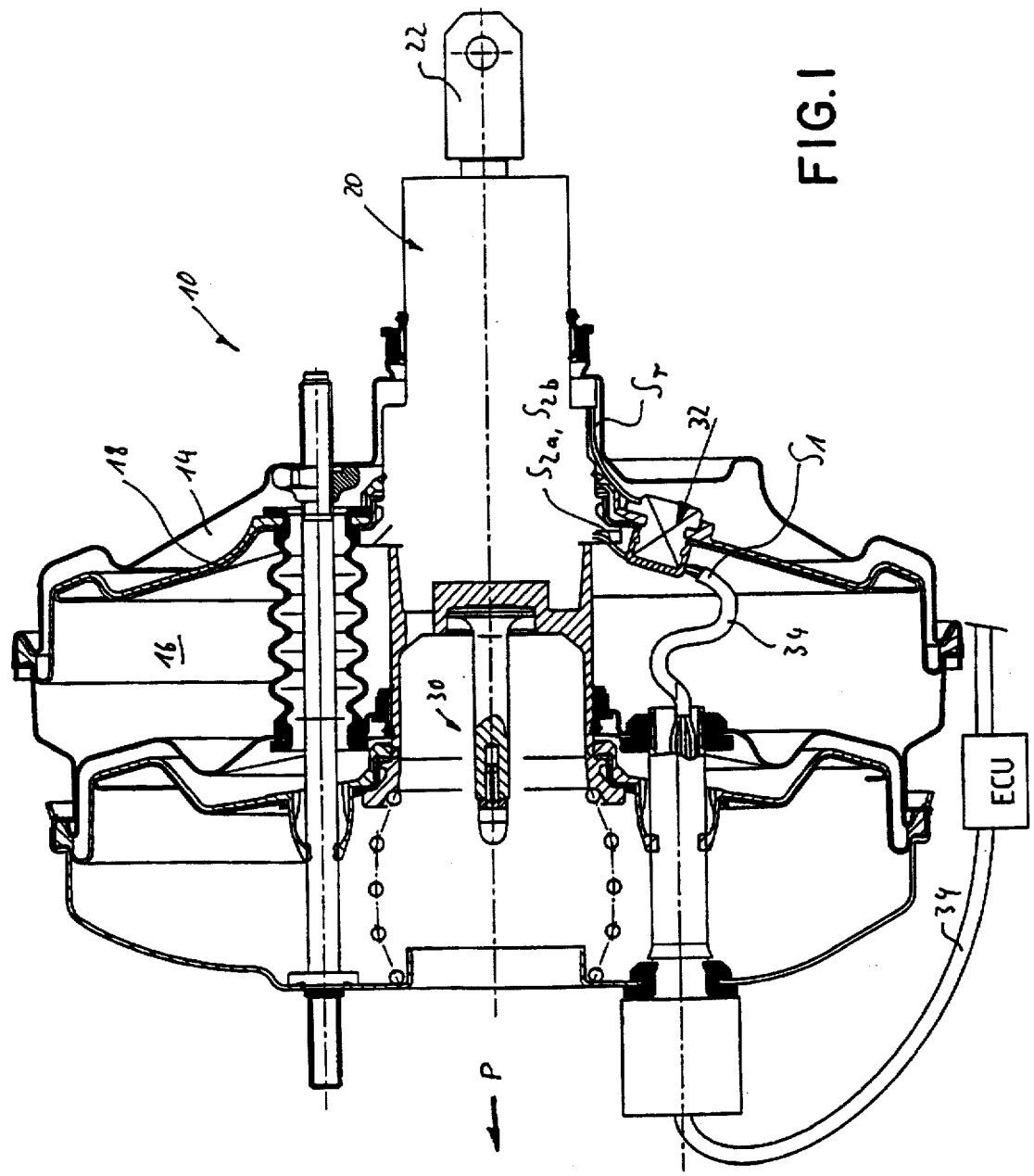
FIG. 1 shows a brake booster having a pressure sensor according to the present invention in a schematic sectional view, wherein only a suggestion of the electronic control device is given.

In FIG. 1 a brake booster which here is formed as a tandem brake booster is indicated at 10. However, the invention also can be used for a single brake booster.

The shown brake booster 10 has a substantially rotationally symmetrical housing 12 in which a (rear) servo chamber 14 and a (front) vacuum chamber 16 are arranged and separated by a movable wall 18 which is coupled to a controllable valve 20 for common relative movement with respect to said housing 12. The front end portion of a rod shaped operating element 22 which in its assembled position is coupled to a brake pedal of the motor vehicle (not shown) acts on said valve 20.

Inside said brake booster a power output element 30 is provided which is supported at the controllable valve 20. The power output element 30 is provided for actuating a main brake cylinder which is not shown.

In the shown non-operated condition with the vacuum source switched off there is atmospheric pressure prevailing in both chambers 14 and 16. When the vacuum source is switched on, for example when the engine is running, the intake manifolds of which are connected with the vacuum chamber 16, a vacuum is created in the vacuum chamber 16 so that the movable wall 18 together with the valve 20 are slightly pushed forward so that a new pressure equilibrium is established between both chambers 14 and 16. Starting from this stand-by position, an operation of the brake booster 16 without backlash is ensured.

Under normal operation of the brake by the driver the brake booster operates in the usual manner by interrupting the connection between both chambers 14 and 16 via the controllable valve 20 so that ambient air flows into the servo chamber 14. Accordingly, an operating force which is enhanced by the brake booster is now provided at the power output element 30.

A pressure sensor 32 which measures the pressure in the servo chamber and which transmits a signal $S_1$ representing the pressure (progression) via a line 34 out of the housing of the brake booster 10 to an electronic control unit ECU is arranged in the movable wall 18. The electronic control unit ECU is connected with a solenoid of the control valve device 20 via a line not further shown so that the control valve 20 can be operated, controlled by the electronic control unit ECU, so that the control valve device 20 opens in order to allow air flowing into the servo chamber 14 or closes in order to separate the servo chamber 14 from the ambient atmosphere. The energization or de-energization of the solenoid of the control valve device 20 is effected depending on the signal representing the pressure prevailing in the servo chamber 14 which signal can be processed differently, as shown in FIGS. 2 and 3.

Figure 2:
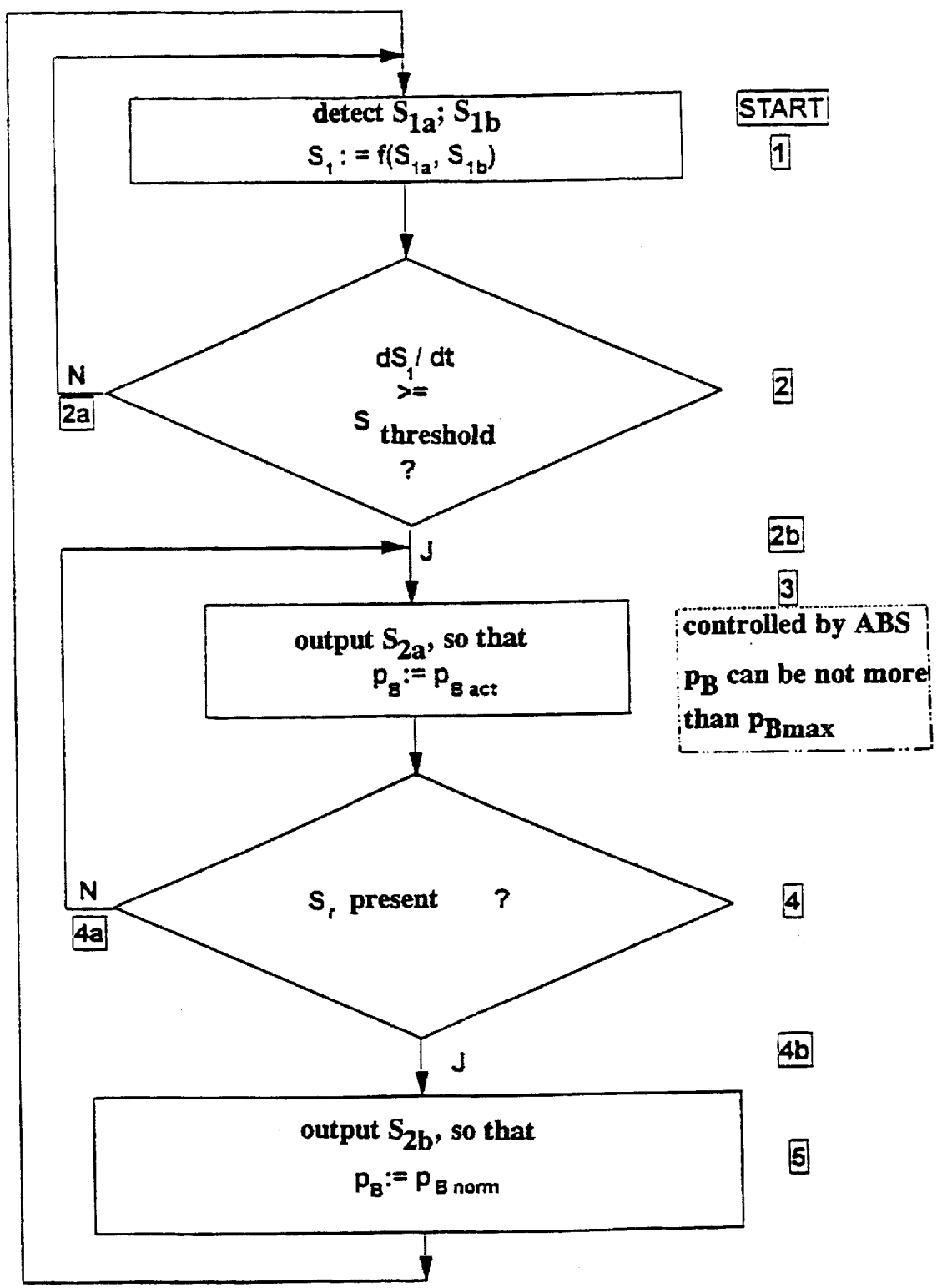
FIG. 2 shows a flow chart of a first embodiment of the method according to the present invention.
Figure 3:
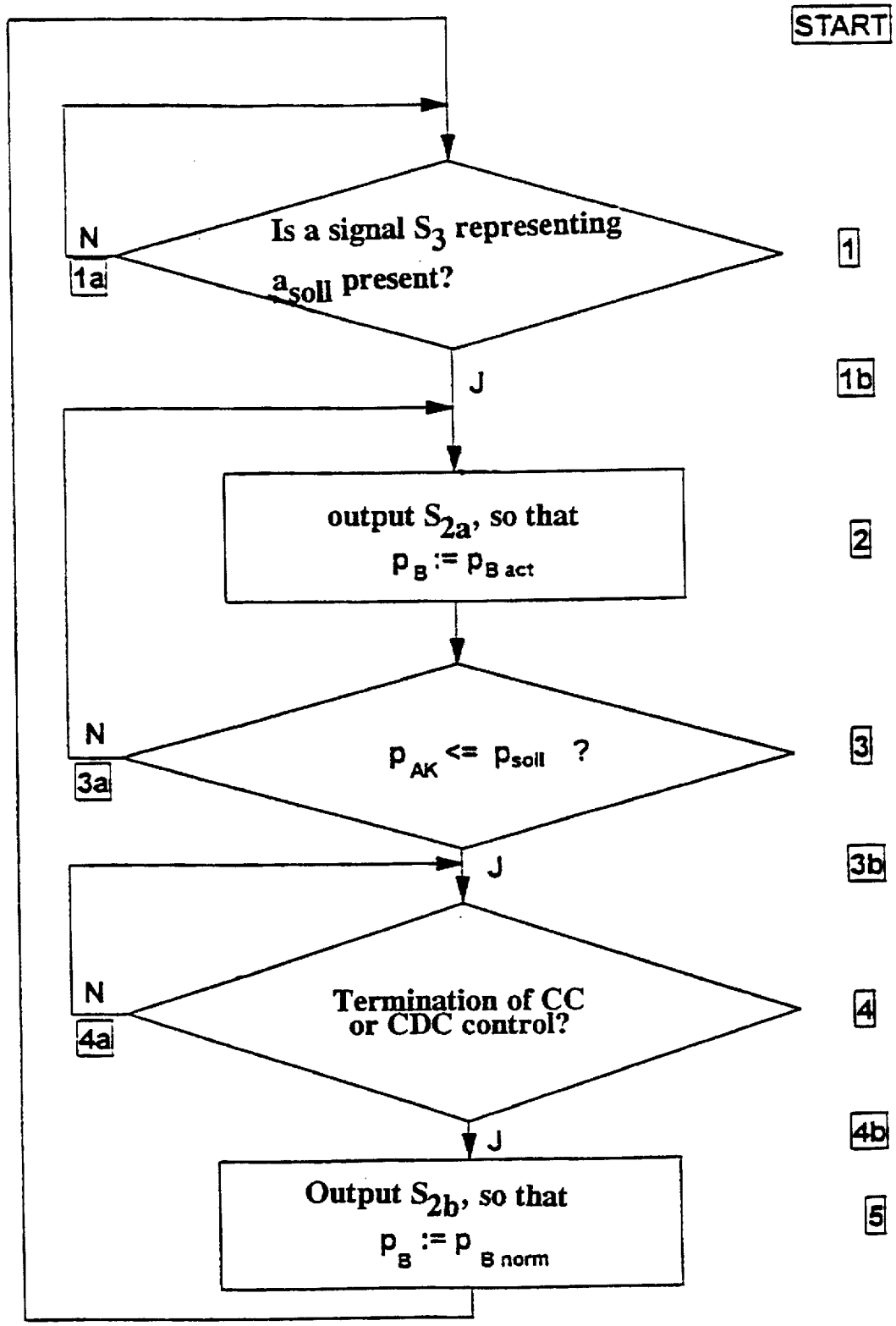
FIG. 3 shows a flow chart of a second embodiment according to the present invention.

In FIG. 2 it is assumed that not only the pressure in the servo chamber 14 but also the pressure in the vacuum chamber 16 is measured and the signals $S_{1a}$, $S_{1b}$ representing these pressure progressions are led to the electronic control unit ECU via line 34 in FIG. 1. In the electronic control unit ECU a common signal $S_1$ is produced therefrom, for example by forming the difference ($S_1 = S_{1a} - S_{1b}$) (step 1 in FIG. 2).

This common signal is differentiated with respect to the time and compared with the threshold value $S_{threshold}$ (step 2 in FIG. 2). When the differentiation signal (dS1/dt) is less than the threshold value $S_{threshold}$, it is jumped back to the start (step 2a in FIG. 2). In case the differentiation signal (dS1/dt) is greater than or equal to the threshold value $S_{threshold}$, it is jumped to step 3 in FIG. 2 (step 2b in FIG. 2). The threshold value $S_{threshold}$ can be either constant or varied depending on further ambient parameters like for example the vehicle speed etc. Moreover, a characteristic progression of pressure (e.g. peak, slope etc.) in the servo chamber or the pressure increase rate can be predetermined and compared with the respective prevailing measured value.

In step 3 in FIG. 2 the electronic control unit ECU outputs a signal $S_{2a}$ to the solenoid of the control valve device 20 which causes an operation of the control valve device 20 so that air flows into the servo chamber 14 and an assisted (emergency) braking is initiated. This results in that the brake pressure $P_B$ in the hydraulic system is raised to an increased pressure value $P_{Bact}$ so that an enhanced brake operation is effected. Blocking of the wheels of the vehicle cannot occur since an anti-blocking system automatic control provides that a maximum brake pressure $P_{Bmax}$ is not exceeded.

In step 4 of FIG. 2 it is checked whether the driver wants to terminate the emergency or target braking. There it is checked whether a reset signal $S_r$ is present which is produced by a switch in the control valve device 20. Form and details of this switch in various embodiments are described in the application P 44 00 688.8 which has been filed prior to and laid open after the present application. This switch detects a lifting of the driver's foot from the brake pedal and gives a corresponding signal $S_r$. If this signal $S_r$ is not present, that is the driver does not want to terminate the braking, the program jumps back to the beginning of step 3 in FIG. 2 (step 4a in FIG. 2).

If the signal $S_r$ is present, accordingly, the driver wants to terminate the braking (step 4b in FIG. 2), the electronic control device ECU outputs signal $S_{2b}$ to the solenoid of the control valve device 20 according to step 5 in FIG. 2. This results in that the solenoid is de-energized or its poles are changed to the opposite direction so that the control valve device 20 interrupts the air flow into the servo chamber 14 which has the effect that the brake pressure $p_B$ in the hydraulic system of the brake system goes back to the normal brake pressure $p_{Bnorm}$.

FIG. 4 schematically shows the automatic control device for decelerating the vehicle starting out from a given reference vehicle deceleration value $a_{soll}$ making use of the before-mentioned apparatus and method, respectively, in order to avoid collision of the vehicle with an obstacle.

Since in this control equipment the control system is quite long and contains a number of delay times, its stability and the dynamic of the control action of the overall system are not optimal.

Figure 5:
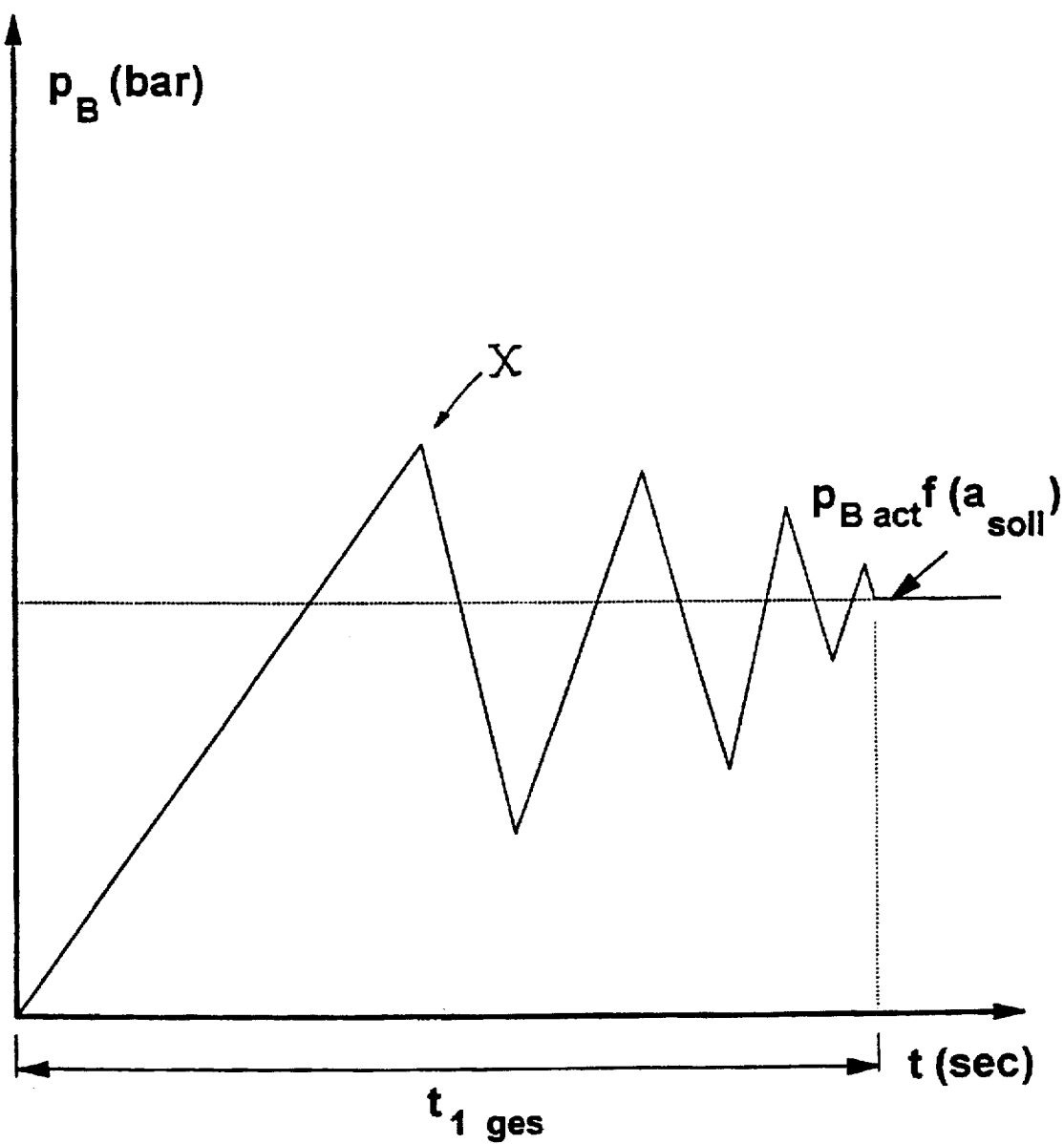
FIG. 5 shows the mode of control of the automatic control according to the present invention according to FIG. 4.

This can be seen also from the diagram in FIG. 5 in which the response time $t_{1ges}$ expires until the brake pressure $p_{Bact}$ by a transient effect has reached the value necessary for a certain vehicle deceleration $a_{soll}$.

At the beginning of a control cycle the electromagnetically operatable control valve device 20 is operated by the electronic control device ECU so that the servo chamber 14 of the brake booster 10 is vented. Due to this, a pressure difference is built up between the servo chamber 14 and the vacuum chamber 16.

This pressure difference causes a displacement of the movable wall 18 in the sense of a reduction of the volume in the vacuum chamber 16 so that the power output element 30 is moved in the direction of arrow P (see FIG. 1). This has the effect that the brakes of the vehicle are actuated and, accordingly, the vehicle is decelerated. The deceleration can be detected by sensors at the wheels of the vehicle and reported to the electronic automatic control device.

Due to the relatively long delay times of the overall system between the operation of the electromagnetically operable control valve device and the feedback of the vehicle deceleration to the electronic control device ECU, the reduced pressure difference has by far exceeded the reference value corresponding to the desired vehicle deceleration (see first overswing X in FIG. 5).

This (concerning the amplitude) decreasing rising above and falling below the respective brake pressure continues as long as the actual vehicle deceleration approaches the reference value $a_{soll}$. The expired time $t_{1ges}$ is the overall reaction time of the control system.

In order to reduce this relatively long overall control time, according to the present invention the cascade control shown in FIG. 6 is provided, wherein an inner control loop (RH, S, U2) effects the automatic control of the pressure difference between the servo chamber and the vacuum chamber, while the outside provided control loop converts a reference deceleration of the vehicle ($a_{soll}$) given by the system into an actual deceleration of the vehicle $a_{Kf}$ in such a manner that upon occurance of a reference deceleration signal a corresponding pressure difference or reference pressure value is generated for the auxiliary controller as a control input. This can be effected for example by selection from a map stored in the electronic control device ECU, whereby an electromagnetic operation of the control valve device is effected so that the pressure difference between the servo chamber and the vacuum chamber or the pressure in the servo chamber, respectively, is adjusted corresponding to the reference value. This obtained reference pressure difference value $dp_{soll}$ represents an average pressure value which is suitable to approximately achieve the required deceleration of the vehicle. The exact adaption to the reference deceleration value is effected by the overall control.

Figure 7:
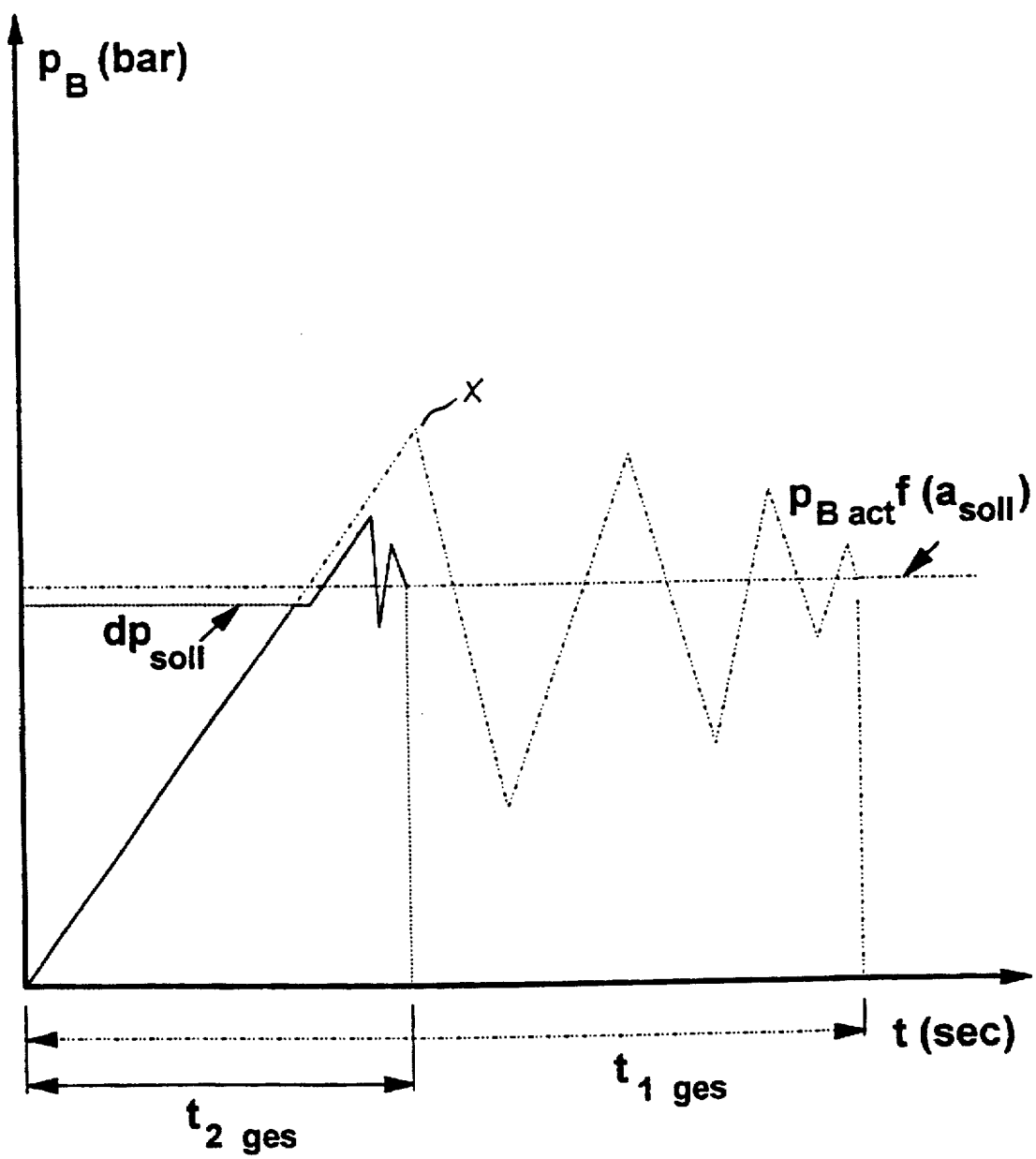
FIG. 7 shows the mode of control of the automatic control according to the present invention according to FIG. 6.

FIG. 7 shows the time response of the cascade control shown in FIG. 6. Apparently, the considerably shorter period $t_{2ges}$ is required to reach the brake pressure necessary for the reference vehicle deceleration $a_{soll}$. At the beginning of the control cycle the pressure difference comparatively fast approaches the reference value $dp_{soll}$ before the system adjusts with respect to the reference value $a_{soll}$.

I claim:

1. A method of operation of a vehicle brake system having an electronically controlled brake booster with a movable wall (18) between a servo chamber (14) and a vacuum chamber (16) comprising the following steps:

a) sensing a pressure ($p_{AK}$) prevailing in the servo chamber (14) of said brake booster with a sensor (32) arranged at or in said movable wall, b) producing a first signal which is characteristic for the pressure ($p_{AK}$, dp) in said serve chamber (14), and c) evaluating the first signal ($S_1$) in order to produce a first drive signal ($S_2$) for an electromagnetically operatable control valve device (20) of said brake booster (10) and d) outputting said first drive signal ($S_{2a}$, $S_{2b}$) to said control valve device (20) which causes an operation of said brake booster (10) in the sense of building up or reducing a brake pressure ($p_B$).

2. Method of operation of a vehicle brake system according to claim 1, characterized in that step c) further comprises the following:

c1) linking the first signal ($S_{1a}$) characteristic for the pressure ($p_{AK}$) prevailing in said servo chamber (14) with a second signal ($S_{1b}$) characteristic for the pressure ($p_{Um}$) prevailing in the surrounding atmosphere of the brake booster (10) or the pressure ($p_{UK}$) prevailing in said vacuum chamber (16) of said brake booster (10) to a common signal ($S_1$).

3. Method of operation of a vehicle brake system according to claim 1, characterized in that step c) further comprises the following:

c2) differentiating the first signal ($S_1$) with respect to the time in order to obtain a differentiation signal (dS1/dt).

4. Method of operation of a vehicle brake system according to claim 1, characterized in that step c) further comprises the following:

c3) comparing the differentiation signal (dS1/dt) with a predetermined threshold value ($S_{threshold}$).

5. Method of operation of a vehicle brake system according to claim 4, characterized in that step c) further comprises the following:

c4) producing a second drive signal ($S_{2a}$) in case said differentiation signal (dS1/dt) is larger than or equal to said threshold value ($S_{threshold}$), wherein said second drive signal ($S_{2a}$) is dimensioned such that it causes an operation of said brake booster (10) which causes a different and larger brake pressure ($P_{Bact}$) as compared with a brake pressure which would result from the momentary position of a brake pedal connected to said brake booster (10).

6. Method of operation of a vehicle brake system according to claim 5, characterized in that
said second drive signal ($S_{2a}$) is dimensioned such that it causes a maximally possible brake pressure ($P_{Bmax}$).

7. Method of operation of a vehicle brake system according to claim 1, characterized in that step c) further comprises the following:

c5) sensing a position of a brake pedal and c6) producing a reset signal ($S_r$) representing a reset of the brake pedal for a predetermined pedal travel.

8. Method of operation of a vehicle brake system according to claim 7, characterized by the further step:

e) outputting a third drive signal ($S_{2b}$) to said control valve device (20) which causes an operation of said brake booster (10) in the sense of reduction of said brake pressure ($P_B$) to a normal brake pressure ($P_{Bnorm}$) when said reset signal ($S_r$) is present.

9. Method of operation of a vehicle brake system according to claim 1, characterized by the further step:

f) producing a trigger signal ($a_{soll}$) being independent of an operation of a brake pedal for said electronic control device (ECU) which depending on said trigger signal ($a_{soll}$) produces a signal (S3) which causes an operation of said brake booster (10) which causes a different and larger momentary deceleration of the vehicle.

10. A method of operation for a vehicle brake system having an electronically controlled brake booster with a movable wall (18) between a servo chamber (14) and a vacuum chamber (16) comprising the following steps:

a) sensing a pressure ($P_{AK}$) prevailing in the serve chamber (14) of said brake booster with a sensor (32);

b) producing a first signal which is characteristic for the pressure ($P_{AK}$, dp) in said servo chamber (14);

c) sensing with said sensor (32) a pressure ($P_{Um}$) prevailing in the surrounding atmosphere of the brake booster (10) or the pressure ($P_{AK}$) prevailing in said vacuum chamber (16) of said brake booster (10);

d) producing a second signal ($S_{1b}$) which is characteristic for the pressure ($P_{Um}$) in the surrounding atmosphere or the pressure ($P_{AK}$) in the vacuum chamber (16);

e) evaluating the first signal ($S_{1a}$) with the second signal ($S_{1b}$) in order to produce a first drive signal ($S_2$) for an electromagnetically operatable control valve device (20) of said brake booster (10); and f) outputting said first drive signal ($S_2$) to said control valve device (20) which causes an operation of said brake booster (10) in the sense of building up or reducing a brake pressure ($P_B$).

11. The method of claim 10 wherein the steps a) and c) are accomplished by said sensor (32) arranged at or in said movable wall (18) of said brake booster (10).

* * * * *